US008784647B2

(12) United States Patent
Kliewer et al.

(10) Patent No.: US 8,784,647 B2
(45) Date of Patent: Jul. 22, 2014

(54) HYDROPROCESSING CATALYSTS AND THEIR PRODUCTION

(75) Inventors: Chris E. Kliewer, Clinton, NJ (US); Stuart L. Soled, Pittstown, NJ (US); Sabato Miseo, Pittstown, NJ (US); Jeffrey S. Beck, Houston, TX (US)

(73) Assignee: ExxonMobil Research and Egineering Company, Annandale, NJ (US)

( * ) Notice: Subject to any disclaimer, the term of this patent is extended or adjusted under 35 U.S.C. 154(b) by 440 days.

(21) Appl. No.: 12/967,354

(22) Filed: Dec. 14, 2010

(65) Prior Publication Data

US 2011/0190557 A1    Aug. 4, 2011

Related U.S. Application Data

(60) Provisional application No. 61/284,524, filed on Dec. 18, 2009.

(51) Int. Cl.
*C10G 45/00*    (2006.01)

(52) U.S. Cl.
USPC ............................................ 208/142; 208/57

(58) Field of Classification Search
USPC ...................... 585/277; 502/64–262; 208/142
See application file for complete search history.

(56) References Cited

U.S. PATENT DOCUMENTS

| 3,161,697 | A | * | 12/1964 | Choufoer et al. ............. 585/277 |
| 3,718,579 | A | * | 2/1973 | Uhl et al. ...................... 208/143 |
| 5,155,073 | A | * | 10/1992 | Elvin .............................. 502/31 |
| 6,278,030 | B1 | | 8/2001 | Vargas et al. |
| 7,544,632 | B2 | | 6/2009 | Soled et al. |
| 7,591,942 | B2 | | 9/2009 | Soled et al. |
| 2005/0040080 | A1 | | 2/2005 | Riley et al. |
| 2007/0090023 | A1 | * | 4/2007 | Soled et al. ................... 208/209 |
| 2009/0200204 | A1 | | 8/2009 | Mironov et al. |

FOREIGN PATENT DOCUMENTS

| WO | WO 00/42126 | * | 7/2000 |
| WO | 2009061295 | | 5/2009 |

OTHER PUBLICATIONS

Kasztelan, S., "A Descriptive Model of Surface Sites on MoS2 (WS2) Particles", Langmuir, vol. 6 1990, pp. 590-595.

* cited by examiner

*Primary Examiner* — Randy Boyer
*Assistant Examiner* — Juan Valencia
(74) *Attorney, Agent, or Firm* — Chad A. Guice (57) ABSTRACT

In a process for producing a hydroprocessing catalyst, a particulate metal oxide composition comprising an oxide of at least one first metal selected from Group 6 of the Periodic Table of the Elements can be mixed with particles of a sulfide of at least one second metal selected from Groups 8 to 10 of the Periodic Table of the Elements to produce a particulate catalyst precursor. The particulate catalyst precursor can then be sulfided under conditions sufficient to at least partially convert the particulate catalyst precursor into a layered metal sulfide having defect sites associated with the second metal sulfide.

10 Claims, 8 Drawing Sheets

HYDROPROCESSING CATALYSTS AND THEIR PRODUCTION

This Application claims the benefit of U.S. Application No. 61/284,524, filed Dec. 18, 2009, which is hereby incorporated by reference herein in its entirety.

FIELD

This invention relates to hydroprocessing catalysts and their production.

BACKGROUND

Hydroprocessing catalysts usually comprise one or more sulfided Group 6 metals combined with one or more Group 8 to 10 metal promoters on a refractory support, such as alumina. Bulk, unsupported catalysts are also known. Hydroprocessing catalysts that are particularly suitable for hydrodesulfurization, as well as hydrodenitrogenation, generally comprise molybdenum and/or tungsten sulfide promoted with a metal such as cobalt, nickel, iron, or a combination thereof. These sulfided catalysts generally have a layered or platelet morphology.

Current research into hydroprocessing catalysts is being driven by the need to produce distillate fuels with lower levels of sulfur and nitrogen, as mandated by environmental regulations, while at the same time meeting the needs of refiners to process crude oils with larger amounts of these heteroatoms. A significant need therefore exists to find catalysts which can do more efficient desulfurization and denitrogenation, particularly when existing hydroprocessing units are limited in their pressure capability.

The ability to modify the nanostructural morphology of hydroprocessing catalysts provides a possible way to control their activity and selectivity. Thus, in U.S. Pat. No. 7,591,942, it was demonstrated that sulfiding a bulk bimetallic Ni (or Co)/Mo (or W) phase containing a surfactant amine with a backbone containing at least 10 carbon atoms gave a catalyst comprising stacked layers of $MoS_2$ (or $WS_2$) having a reduced stack height as compared to that obtained by sulfiding the carbon-free bulk oxide. A similar result was reported for bulk ternary Ni—Mo—W catalysts in U.S. Pat. No. 7,544,632. Lower stack heights are important, since they imply the presence of smaller crystals of Mo/W sulfides, which in turn results in a larger surface area available for catalysis.

Another potential route for controlling catalyst activity is the generation of lattice defects in the crystal structure of the catalyst since lattice defects can create special sites associated with increased activity and/or selectivity. See Kaszstelan, S. A. "Descriptive Model of Surface Sites on $MoS_2$ ($WS_2$) Particles," *Langmuir*, 6 (1990), pages 590-595.

Recent work by the present inventors using ex-situ transmission electron microscopy (TEM)-based time-temperature-transformation sulfidation studies has shown that ditrital $Ni_xS$ particles develop before $MoS_2/WS_2$ during sulfiding of molybdenum and tungsten oxides. Conventional TEM (CTEM) imaging, in combination with elemental analysis via energy dispersive spectrometry (EDS) and TEM tomography (TEMT), reveals that $MoS_2/WS_2$ particles grow as relatively straight layered structures in regions where no detrital $Ni_xS$ particles are detected. Thus, these relatively straight layers of $MoS_2/WS_2$ require minimal, if any, lattice defects to form. However, during sulfidation, hydrogen spillover at detrital $Ni_xS$ particle surfaces results in nucleation and growth of layered $MoS_2/WS_2$ structures with a curved morphology. CTEM, EDS, and TEMT data indicate that the $MoS_2/WS_2$ particle curvature conforms to that of the detrital $Ni_xS$ particle nucleating surface. Thus, these $MoS_2/WS_2$ structures develop lattice defects to accommodate their growth around the detrital $Ni_xS$ particle's surface. Because lattice defects can create special sites associated with increased activity and/or selectivity, the ability to control defects sites and their site density is important.

Thus, according the present invention, it has been found that by "seeding" a Mo(W) oxide precursor material with size and shape-controlled $Ni_xS$ particles, the $Ni_xS$ seeds can control the curvature of the $MoS_2/WS_2$ particles produced on subsequent sulfiding, and hence the $MoS_2/WS_2$ defect sites and defect site density. Similar $MoS_2/WS_2$ morphological control can be achieved in systems seeded with $Co_xS$ particles or containing other Group 8 to 10 metals that sulfide at temperatures lower than Mo(W). The present "seeding" phenomenon seems similar to the templating action exhibited by various organic materials used to direct the structure of various zeolitic materials. However, it is believed that the concept of using an inorganic phase as the templating agent for another inorganic phase has never been previously been documented.

SUMMARY

A first aspect of the invention relates to a process for producing a hydroprocessing catalyst, the process comprising: (a) mixing a particulate metal oxide composition comprising an oxide of at least one first metal selected from Group 6 of the Periodic Table of the Elements with particles of a sulfide of at least one second metal selected from Groups 8 to 10 of the Periodic Table of the Elements to produce a particulate catalyst precursor; and (b) sulfiding the particulate catalyst precursor under conditions sufficient to at least partially convert the components of the particulate catalyst precursor into a layered metal sulfide having defect sites associated with the second metal sulfide.

A second aspect of the invention relates to a hydroprocessing catalyst made according to the first aspect of the invention.

A third aspect of the invention relates to a hydroprocessing method comprising contacting a hydrocarbon feedstock with hydrogen in the presence of a hydroprocessing catalyst according to the second aspect of the invention under conditions sufficient to hydroprocess the hydrocarbon feedstock.

A fourth aspect of the invention relates to a method for hydroprocessing a hydrocarbon-containing feedstock, the method comprising: (a) producing a hydroprocessing catalyst according to the first aspect of the invention; and (b) contacting the hydrocarbon-containing feedstock with hydrogen in the presence of the hydroprocessing catalyst under conditions sufficient to hydroprocess the hydrocarbon feedstock.

BRIEF DESCRIPTION OF THE DRAWINGS

FIGS. 1(*a*) and (*b*) are bright field transmission electron micrographs (TEM) of the fully sulfided metal oxide catalyst of Example 1.

FIGS. 3(*a*), (*b*), and (*c*) are bright field TEMs of the metal oxide catalyst of Example 2 at various stages during a first sulfidation study.

FIGS. 4(*a*), (*b*), and (*c*) are bright field TEMs of various regions of the metal oxide catalyst of Example 2 at the end of a second sulfidation study.

FIGS. 5(a), (b), and (c) are bright field TEMs of the metal oxide catalyst of Example 2 at various stages during a third sulfidation study.

FIGS. 9(a), (b), and (c) are further bright field TEM images of the metal oxide catalyst of Example 3 showing, respectively: the fresh crystalline lattice structure of a Mo oxide particle; the oxide to sulfide transformation at the outer surface of the Mo oxide particle after about 1 hour at about 350° C. in ~10% $H_2S$; and continued oxide to sulfide transformation of the Mo oxide particle after about 1 hour at about 400° C. in ~10% $H_2S$.

FIGS. 10(a), (b), and (c) are still further bright field TEM images of the metal oxide catalyst of Example 3 showing, respectively: the fresh crystalline lattice structure of a W oxide particle; the oxide to sulfide transformation at the outer surface of the W oxide particle after about 2 hours at about 350° C. in ~10% $H_2S$; and continued oxide to sulfide transformation of the W oxide particle after about 2 hours at about 450° C. in ~10% $H_2S$.

DETAILED DESCRIPTION OF THE EMBODIMENTS

Described herein is a process for producing a hydroprocessing catalyst, in which a particulate metal oxide composition comprising an oxide of at least one first metal selected from Group 6 of the Periodic Table of the Elements, and optionally an oxide of one or more further metals from Groups 8 to 10, can be mixed with particles of a sulfide of at least one second metal selected from Groups 8 to 10 of the Periodic Table of Elements to produce a particulate catalyst precursor. The precursor can then be sulfided under conditions sufficient to at least partially convert the precursor to a layered metal sulfide having defect sites associated with the second metal sulfide. Without being bound to theory, the defect sites appear to be associated with the production of curved metal sulfide particles, in addition to the relatively planar layered structures produced in the absence of the second metal sulfide particles.

As used herein, the numbering scheme for the Groups of the Periodic Table of Elements ("New notation") is as disclosed in *Chemical and Engineering News*, 63(5), 27 (1985).

The particulate metal oxide composition used in the present process comprises an oxide of at least one first metal from Group 6, particularly molybdenum and/or tungsten. Additionally, the metal oxide composition can also advantageously contain an oxide of at least one further metal selected from Groups 8 to 10, such as cobalt and/or nickel. Nevertheless, it should be appreciated that, even without any Group 8 to 10 metal oxide in the particulate metal oxide composition, both the particulate catalyst precursor and the final sulfided catalyst should still both necessarily contain at least one Group 8 to 10 metal, by virtue of the addition of the second metal sulfide particles. In one embodiment, the particulate metal oxide composition can comprise at least about 45 wt %, for example at least about 50 wt % or at least about 55 wt % of the Group 6 metal oxide(s). In this embodiment, the particulate metal oxide composition can comprise up to about 50 wt %, for example up to about 45 wt % of Group 8 to 10 metal oxide(s). Additionally or alternately, the particulate metal oxide composition can comprise from about 45 wt % to about 70 wt %, for example from about 50 wt % to about 65 wt % or from about 55 wt % to about 60 wt % of the Group 6 metal oxide(s), and/or from about 25 wt % to about 50 wt %, for example from about 30 wt % to about 45 wt % of the Group 8 to 10 metal oxide(s).

The particulate metal oxide composition useful in the present process can conveniently be produced by forming a reaction mixture comprising one or more sources of the Group 6 metal oxide(s), and optionally one or more sources of the Group 8 to 10 metal oxide(s), in a protic liquid and heating the reaction mixture under substantially hydrothermal conditions to form the particulate metal oxide composition. Any protic solvent can be used in the reaction mixture, representative examples including, but not limited to, water, carboxylic acids, alcohols (such as methanol, ethanol, and mixtures thereof), and the like, and combinations or reaction products thereof. Generally, the protic liquid can comprise water, e.g., mixtures of an alcohol and water, or preferably can be water. The metal oxide source(s) may be dissolved in the protic liquid or may be only sparingly soluble, such that the first (and optional second) metal oxide source(s) can remain at least partly in the solid state during the hydrothermal reaction.

In the present context, a substantially hydrothermal reaction indicates heating of the reaction mixture to a temperature above the atmospheric boiling point of the protic liquid used in the reaction mixture. Typically, this can be achieved in a sealed reaction vessel, preferably under autogenous pressure, or without applying external pressure. Given the synthesis conditions, autogenous pressures can generally be above atmospheric pressure, i.e. above 1 bara (above 100 kPaa). Where the protic liquid is water, the reaction can generally be conducted in an autoclave at a temperature from about 105° C. to about 180° C., for example from about 110° C. to about 170° C., from about 120° C. to about 160° C., or from about 140° C. to about 160° C. The reaction can be considered substantially complete when an X-ray diffraction pattern of the product shows no clearly discernible reflections of the unreacted starting compounds, which typically can occur over a reaction time of at least about 2 hours, for example at least about 4 hours, at least about 6 hours, or at least about 8 hours. Additionally or alternately, details surrounding a suitable hydrothermal process for producing the particulate metal oxide composition can be found in U.S. Patent Application Publication No. 2007/0090023, the entire contents of which are incorporated herein by reference.

In order to produce the desired hydroprocessing catalyst, the particulate metal oxide composition can be mixed with particles of a sulfide of at least one second metal selected from Groups 8 to 10 of the Periodic Table of Elements to produce the particulate catalyst precursor. In a preferred embodiment, the second metal sulfide can be selected from nickel sulfide and/or cobalt sulfide. Additionally or alternately, the second metal sulfide can be present in the particulate catalyst precursor in an amount from about 15 wt % to about 35 wt %, for example from about 20 wt % to about 25 wt %, based on the total weight of the precursor composition. The resultant precursor composition can then be sulfided under conditions sufficient to at least partially convert, and generally to substantially completely convert, the components of the particulate catalyst precursor into a layered metal sulfide. Suitable sulfiding conditions can include, but are not limited to, heating the particulate catalyst precursor in an atmosphere containing hydrogen sulfide at a temperature from about 350° C. to about 425° C., for example from about 375° C. to about 400° C., for a sulfiding time from about 1 hour to about 6 hours, for example from about 2 hours to about 4 hours. In one embodiment, the hydrogen sulfide-containing atmosphere can be a mixture of hydrogen and hydrogen sulfide, containing from about 5 vol % to about 20 vol % $H_2S$, for example from about 10 vol % to about 15 vol % $H_2S$. Under these conditions, as the metal oxide component of the precursor undergoes sulfidation, sulfide crystals can form and grow around the second metal sulfide particles, which can act as an inorganic template, tending to produce defect sites visible by transmission electron microscopy (TEM) as curved crystal regions.

The resultant sulfided catalyst composition can be used ubiquitously in hydroprocessing processes to treat a variety of hydrocarbon feeds under wide-ranging reaction conditions. One example of such conditions includes a temperature from about 200° C. to about 450° C., a hydrogen pressure from about 5 barg (about 2.5 MPag) to about 300 barg (about 150 MPag), a liquid hourly space velocity (LHSV) from about 0.05 $hr^{-1}$ to about 10 $hr^{-1}$, and a hydrogen treat gas rate from about 36 $Sm^3/m^3$ (about 200 scf/bbl) to about 1700 $Sm^3/m^3$ (about 10,000 scf/bbl). The term "hydroprocessing," as used herein, should be understood to encompass any process of reacting a hydrocarbon feed with hydrogen at the temperatures and pressures noted above. Specifically, hydroprocessing can include hydrodemetallation, hydrodewaxing, hydrotreating, hydrofining, hydrogenation, hydrodesulfurization, hydrodenitrogenation, hydrodeoxygenation, hydrodearomatization, hydroisomerization, hydrocracking (including selective hydrocracking), and the like, and combinations thereof. Depending on the type of hydroprocessing and on the reaction conditions, the products of hydroprocessing may exhibit improved viscosities, viscosity indices, saturates content, low temperature properties, volatilities, depolarization, and/or the like, as compared to the relevant composition prior to hydroprocessing. It should be understood that hydroprocessing can be practiced in one or more reaction zones and in either countercurrent flow or co-current flow mode, though each mode may require different reactor elements to be present. By countercurrent flow mode is meant a process mode in which the feedstream flows in a direction opposite to the flow of hydrogen-containing treat gas. Accordingly, by co-current flow mode is meant a process mode in which the feedstream and the hydrogen-containing treat gas are flowing in similar directions. The hydroprocessing reactor can be operated in any suitable catalyst bed arrangement mode, for example fixed bed, slurry bed, ebullating bed, or the like.

A wide variety of hydrocarbon feedstocks can be hydroprocessed in the presence of a catalyst made as described herein. Suitable feedstocks for hydroprocessing can include, but are not limited to, whole and/or reduced (distilled) petroleum crudes, atmospheric and/or vacuum residua, propane deasphalted residua (e.g., brightstock), cycle oils, FCC tower bottoms, gas oils (including atmospheric and vacuum gas oils, as well as coker gas oils), light to heavy distillates (including raw virgin distillates), hydrockrackates, hydrotreated oils, dewaxed oils, slack waxes, Fischer-Tropsch waxes, raffinates, naphthas, and the like, and mixtures thereof.

Additionally or alternately, the present invention can include one or more of the following embodiments.

Embodiment 1

A process for producing a hydroprocessing catalyst, the process comprising: (a) mixing a particulate metal oxide composition comprising an oxide of at least one first metal selected from Group 6 of the Periodic Table of the Elements with particles of a sulfide of at least one second metal selected from Groups 8 to 10 of the Periodic Table of the Elements to produce a particulate catalyst precursor; and (b) sulfiding the particulate catalyst precursor under conditions sufficient to at least partially convert the components of the particulate catalyst precursor into a layered metal sulfide having defect sites associated with the second metal sulfide.

Embodiment 2

The process of embodiment 1, wherein the at least one first metal is molybdenum and/or tungsten.

Embodiment 3

The process of embodiment 1 or embodiment 2, wherein the particulate metal oxide composition comprises from 45 wt % to 70 wt %, preferably from about 55 wt % to about 60 wt %, of Group 6 metal oxide(s).

Embodiment 4

The process of any of the previous embodiments, wherein the particulate metal oxide composition further comprises an oxide of at least one further metal selected from Groups 8 to 10 of the Periodic Table of the Elements.

Embodiment 5

The process of embodiment 4, wherein the at least one further metal is cobalt and/or nickel.

Embodiment 6

The process of embodiment 4 or embodiment 5, wherein the particulate metal oxide composition comprises up to about 45 wt % of Group 8 to 10 metal oxide(s).

Embodiment 7

The process of any one of the previous embodiments, wherein the particulate metal oxide composition is produced by forming a reaction mixture comprising a source of the first metal oxide in a protic liquid and heating the reaction mixture under hydrothermal conditions to form the particulate metal oxide composition.

Embodiment 8

The process of any one of the previous embodiments, wherein the at least one second metal sulfide is nickel sulfide and/or cobalt sulfide.

Embodiment 9

The process of any one of embodiments 4-8, wherein the particulate catalyst precursor comprises from about 15 wt % to about 35 wt %, preferably from about 20 wt % to about 25 wt %, of the second metal sulfide.

Embodiment 10

The process of any one of the previous embodiments, wherein the sulfiding is conducted by heating the particulate catalyst precursor in the presence of hydrogen sulfide at a temperature from about 350° C. to about 425° C., preferably from about 375° C. to about 400° C., for about 1 hour to about 6 hours, preferably from about 2 hours to about 4 hours.

Embodiment 11

A hydroprocessing catalyst composition produced by the process of any one of the previous embodiments.

Embodiment 12

A hydroprocessing method comprising contacting a hydrocarbon feedstock with hydrogen in the presence of the catalyst composition of embodiment 11 under conditions sufficient to hydroprocess the hydrocarbon feedstock.

Embodiment 13

A method for hydroprocessing a hydrocarbon-containing feedstock, the method comprising: (a) producing a hydroprocessing catalyst according to the process of any one of embodiments 1-10; and (b) contacting the hydrocarbon-containing feedstock with hydrogen in the presence of the hydroprocessing catalyst under conditions sufficient to hydroprocess the hydrocarbon feedstock.

EXAMPLES

The invention will now be more particularly described with reference to the accompanying drawings and the following non-limiting Examples.

Example 1

A $Ni_1Mo_{0.5}W_{0.5}O_4$ composition was prepared following the protocol described in U.S. Patent Application Publication No. 2007/0090023. The $Ni_1Mo_{0.5}W_{0.5}O_4$ pellets were sulfided by transferring about 1-2 grams into a quartz boat placed inside a Lindberg furnace. The furnace was purged for about 15 minutes with flowing (~200 cm$^3$/min) hydrogen containing about 10 vol % $H_2S$. The pellets were heated under the same flowing (~200 cm$^3$/min) ~10 vol % $H_2S$ (remainder $H_2$) from ambient temperature (about 20-25° C.) to about 400° C. in about 45 minutes and was held at about 400° C. for about 2 hours. The pellets were subsequently cooled and were held at ambient temperature for about 30 minutes under flowing (~200 cm$^3$/min) ~10 vol % $H_2S$ (remainder $H_2$). The furnace was purged for about 30 minutes with flowing (~300 cm$^3$/min) nitrogen. Lastly, the pellets were passivated overnight in flowing (~50 cm$^3$/min) ~1 vol % $O_2$ (remainder He) and were then removed from the furnace.

Figure 1A:
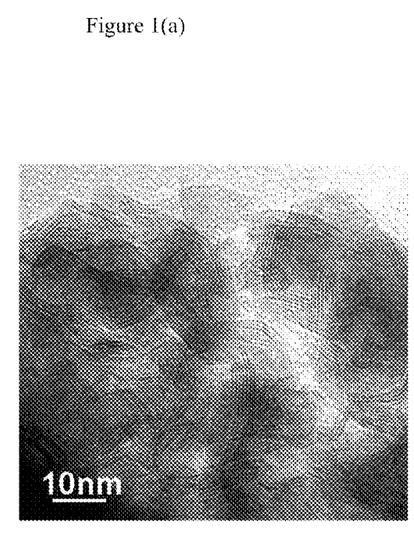
Figure 1B:
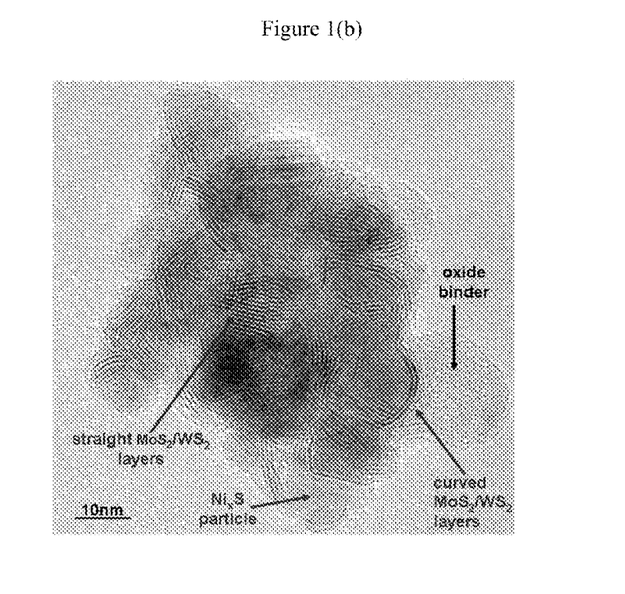
Figure 2:
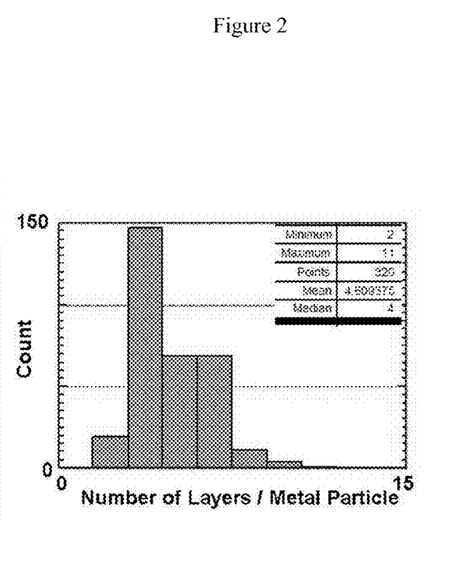
FIG. 2 is a histogram showing the average $MoS_2/WS_2$ particle stack height of the fully sulfided metal oxide catalyst of Example 1.

Four to five of the passivated, sulfided $Ni_1Mo_{0.5}W_{0.5}$ pellets were crushed into fines (pieces <~100 nm thick) using an agate mortar and pestle. The fines were dusted onto a standard, 200 mesh, holey, carbon-coated TEM grid and were examined in the bright field TEM imaging mode of a Philips CM200F™ instrument at an accelerating voltage of approximately 200 kV. The results are shown in FIGS. 1(a)-(b). Digital images were collected from randomly selected regions of the material using a Gatan CCD™ camera and Gatan's Digital Micrograph™ v.2.5 software. Stack heights for over 300 $MoS_2/WS_2$ crystals were counted manually, and the data was plotted into the histogram shown in FIG. 2. It can be seen from FIG. 2 that the average $MoS_2/WS_2$ particle stack height was about 4.6 layers per particle. General features within the bulk catalyst were identified using energy dispersive spectrometry (EDS) data collected from a particularly thin region of the catalyst (see, e.g., FIG. 1(b)).

Example 2

A series time-temperature-transformation study involving sulfidation of a fresh $Ni_1Mo_{0.5}W_{0.4}O_4$ composition was undertaken. Again pellets of the fresh oxide were prepared according to U.S. Patent Application Publication No. 2007/0090023. In all cases, the oxide pellets were prepared for TEM examination as described above. Randomly selected regions in the oxide samples were imaged, and their locations on the TEM grids were mapped using a Gatan CCD™ camera and Gatan's Digital Micrograph™ v.2.5 software. All TEM grids were sulfided by heating them at about 2° C./min in flowing (~20 cm$^3$/min) ~10 vol % $H_2S$ (remainder $H_2$). The sulfidation times and temperatures were varied in each case to better assess $Ni_xS$ and $MoS_2/WS_2$ particle development. The details of each sulfiding study are described below.

Figure 3:
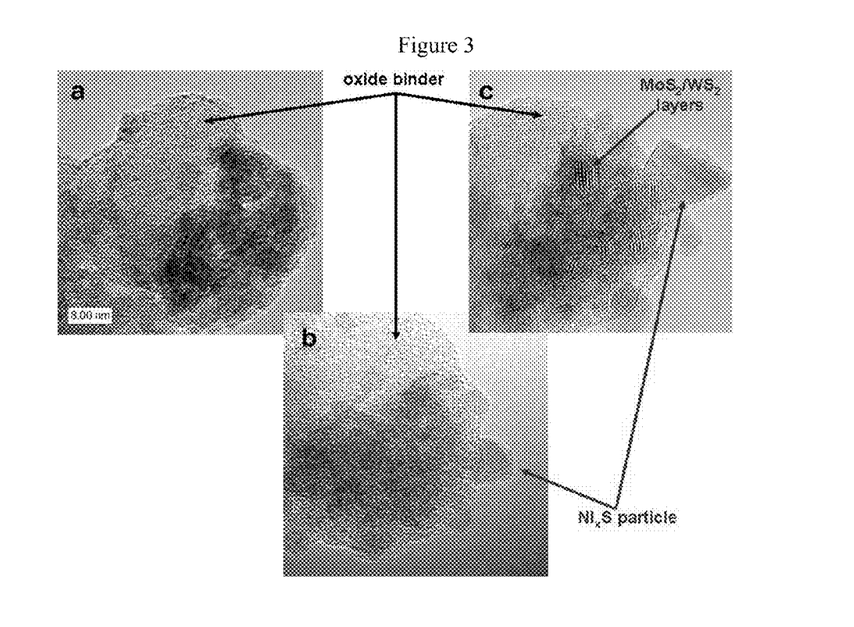

In a first study, a TEM grid of the fresh oxide was sealed in a reactor, and the reactor was purged at ambient temperature with flowing (~50 cm$^3$/min) nitrogen for about 30 minutes and was then purged with flowing (~20 cm$^3$/min) ~10 vol % $H_2S$ (remainder $H_2$) for about an additional 30 minutes. The grid was then heated at about 2° C./min in flowing (~20 cm$^3$/min) ~10 vol % $H_2S$ (remainder $H_2$) to about 200° C. and was held at about 200° C. in flowing (~20 cm$^3$/min) ~10 vol % $H_2S$ (remainder $H_2$) for about 8 hours. The grid was then cooled under flowing (~20 cm$^3$/min) ~10 vol % $H_2S$ (remainder $H_2$) back to ambient temperature. The reactor was subsequently purged overnight (about 8-16 hours) with flowing (~50 cm$^3$/min) nitrogen. The grid was removed from the reactor and was transferred into the TEM, where regions that had previously been mapped were re-examined as described above. FIG. 3(a) is a TEM of the fresh oxide, and FIG. 3(b) is a TEM of the material after sulfiding for about 8 hours at only about 200° C. FIG. 3(b) reveals that detrital $Ni_xS$ particles nucleated and grew very early in the sulfidation process, but at this stage no $MoS_2/WS_2$ structures were yet observed. Consequently, the grid was placed back into the sulfiding reactor and was again heated at about 2° C./min in flowing (~20 cm$^3$/min) ~10 vol % $H_2S$ (remainder $H_2$) to about 375° C. and was held at about 375° C. in flowing (~20 cm$^3$/min) ~10 vol % $H_2S$ (remainder $H_2$) for about 4 more hours. The grid was then cooled under flowing (~20 cm$^3$/min) ~10 vol % $H_2S$ (remainder $H_2$) to ambient temperature. The reactor was subsequently purged overnight under flowing (~50 cm$^3$/min) nitrogen. The grid was then removed from the reactor and was transferred into the TEM, where the regions that had previously been mapped were again re-examined as described above. The results are shown in FIG. 3(c), which indicates that the subsequent ~4 hour sulfidation treatment at about 375° C. resulted in substantially fully developed $Ni_xS$ and $MoS_2/WS_2$ particles.

Figure 4:
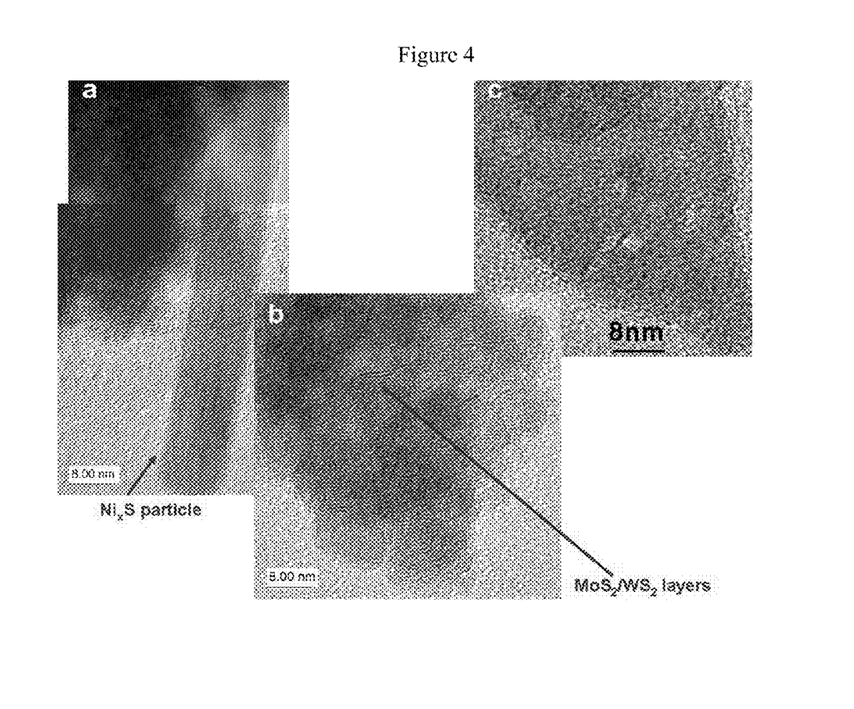

A second sulfidation study was conducted on a separate TEM grid of the fresh oxide to determine the extent of $Ni_xS$ and $MoS_2/WS_2$ phases present after only about 1 hour treatment in ~10 vol % $H_2S$ (remainder $H_2$) at about 300° C. Thus, a TEM grid of the fresh oxide was again sealed in the sulfidation reactor, and the reactor was purged at ambient temperature as described above. The grid was then heated at about 2° C./min in flowing (~20 cm$^3$/min) ~10 vol % $H_2S$ (remainder $H_2$) to about 300° C. and was held at about 300° C. in flowing (~20 cm$^3$/min) ~10 vol % $H_2S$ (remainder $H_2$) for about 1 hour. The grid was then cooled to ambient temperature, and the reactor was purged overnight as described above. The grid was removed from the reactor and transferred into the TEM, where the regions throughout the sample were examined and imaged as described above. FIG. 4 presents the results of that study, which revealed the presence of substantially fully formed detrital $Ni_xS$ particles (FIG. 4(a)) within the structure. FIG. 4(b) indicates the early development of a few $MoS_2/WS_2$ particles, and FIG. 4(c) shows a molybdenum oxide particle. The molybdenum oxide particle represented a very small percentage (<~1%) of the material and exhibited minimal, if any, sulfidation after about 1 hour at about 300° C. These data reflect the need for either higher temperature or more time for substantially complete $MoS_2/WS_2$ particle development.

Figure 5:
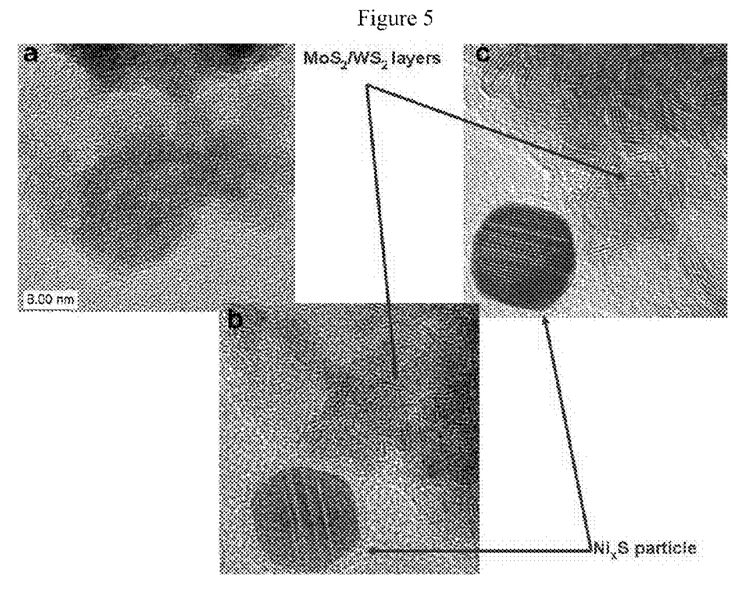

Thus, a third study involving another grid of the fresh oxide was undertaken. As previously described, the grid was sealed in sulfidation unit, and the unit was purged at ambient temperature. The grid was then heated at about 2° C./min in flowing (~20 cm³/min) ~10 vol % $H_2S$ (remainder $H_2$) to about 300° C. and was held at about 300° C. in flowing (~20 cm³/min) ~10 vol % $H_2S$ (remainder $H_2$) for about 5 hours. The grid was then cooled to ambient and the reactor was purged as described above. The grid was removed from the reactor and was transferred into the TEM, where the regions that had previously been mapped were re-examined as described above. The results are shown in FIGS. 5(a) and 5(b). FIG. 5(a) is the TEM of the fresh oxide, whereas FIG. 5(b) is the TEM after about 5 hours at about 300° C. in ~10 vol % $H_2S$ (remainder $H_2$) and shows the presence of substantially fully formed detrital $Ni_xS$ particles. FIG. 5(b) also indicates the early development of a few $MoS_2/WS_2$ particles, but no fully formed $MoS_2/WS_2$ structures were yet observed. Consequently, the grid was placed back into the sulfidation unit, and, after purging at ambient temperature as described previously, the grid was then heated at about 2° C./min in flowing (~20 cm³/min) ~10 vol % $H_2S$ (remainder $H_2$) to about 400° C. and was held at about 400° C. in flowing (~20 cm³/min) ~10 vol % $H_2S$ (remainder $H_2$) for about an additional 1 hour. The grid was then cooled to ambient temperature, and the reactor was purged as described above. The grid was removed from the reactor and was transferred into the TEM, where the regions that had previously been mapped were again re-examined as described above. The results are shown in FIG. 5(c). The $MoS_2/WS_2$ particles in this micrograph appeared substantially fully developed subsequent to the ~1 hour sulfidation treatment at about 400° C. (compare FIGS. 5(b) and 5(c)). Thus, from these sulfidation-based time-temperature-transformation studies, it is clear that $Ni_xS$ particles formed prior to the development of the $MoS_2/WS_2$ particles.

Example 3

Figure 6:
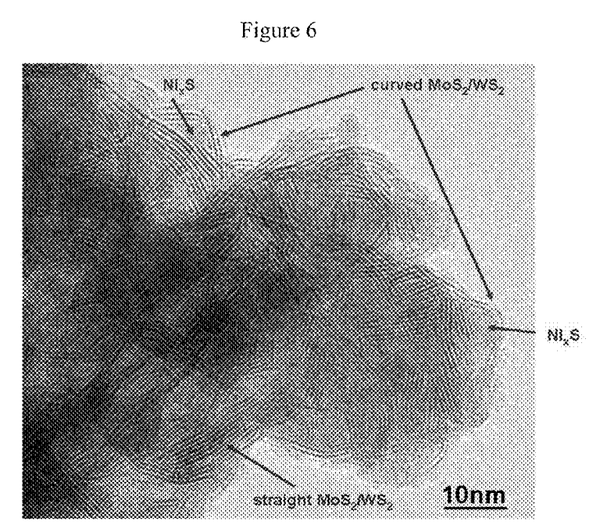
FIGS. 6 to 8 are bright field TEMs of various regions of the fully sulfided metal oxide catalyst of Example 3.
Figure 7:
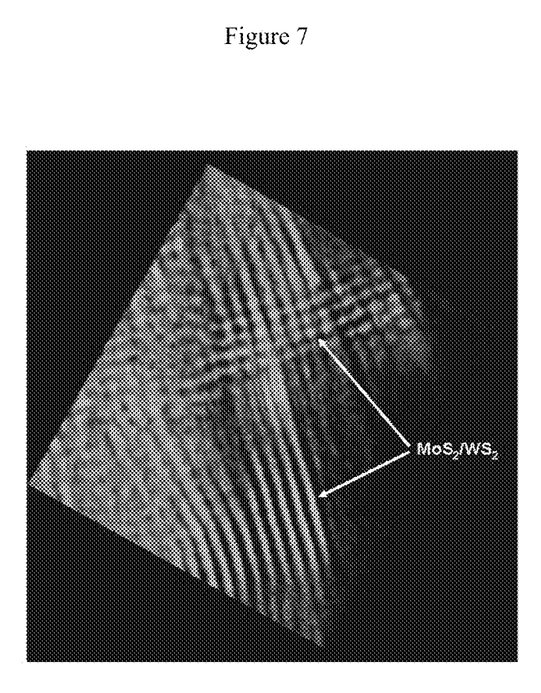
Figure 8:
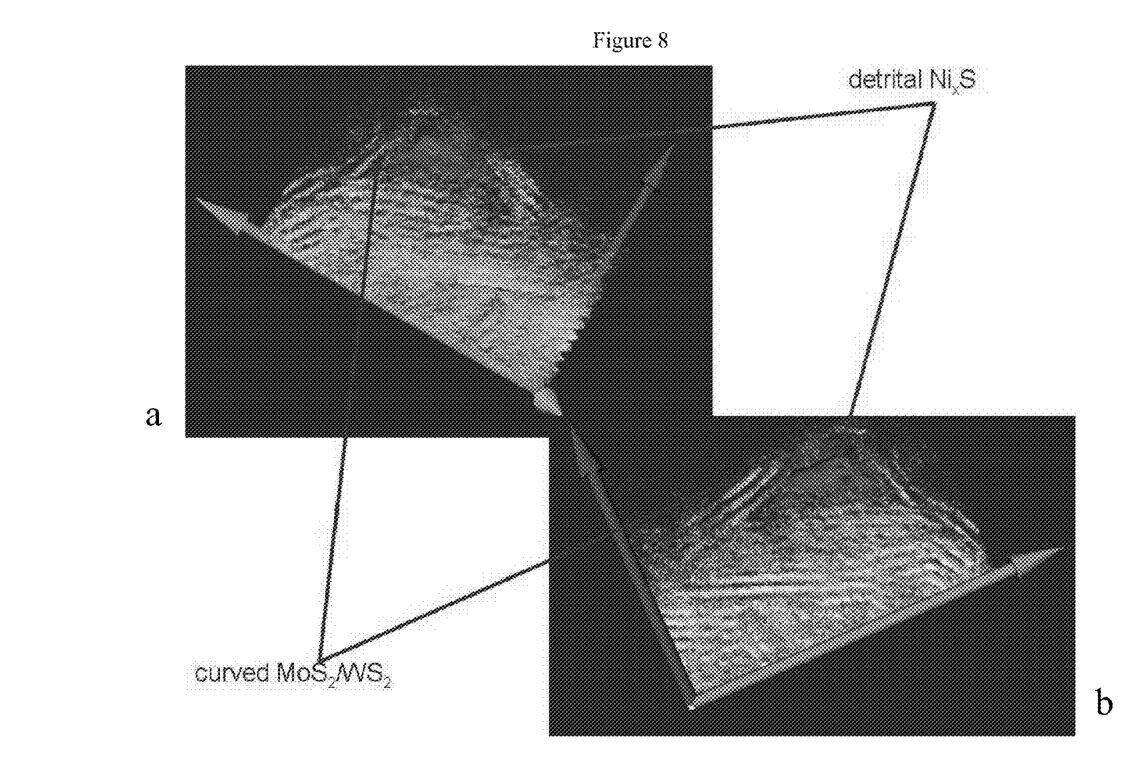
Figure 9:
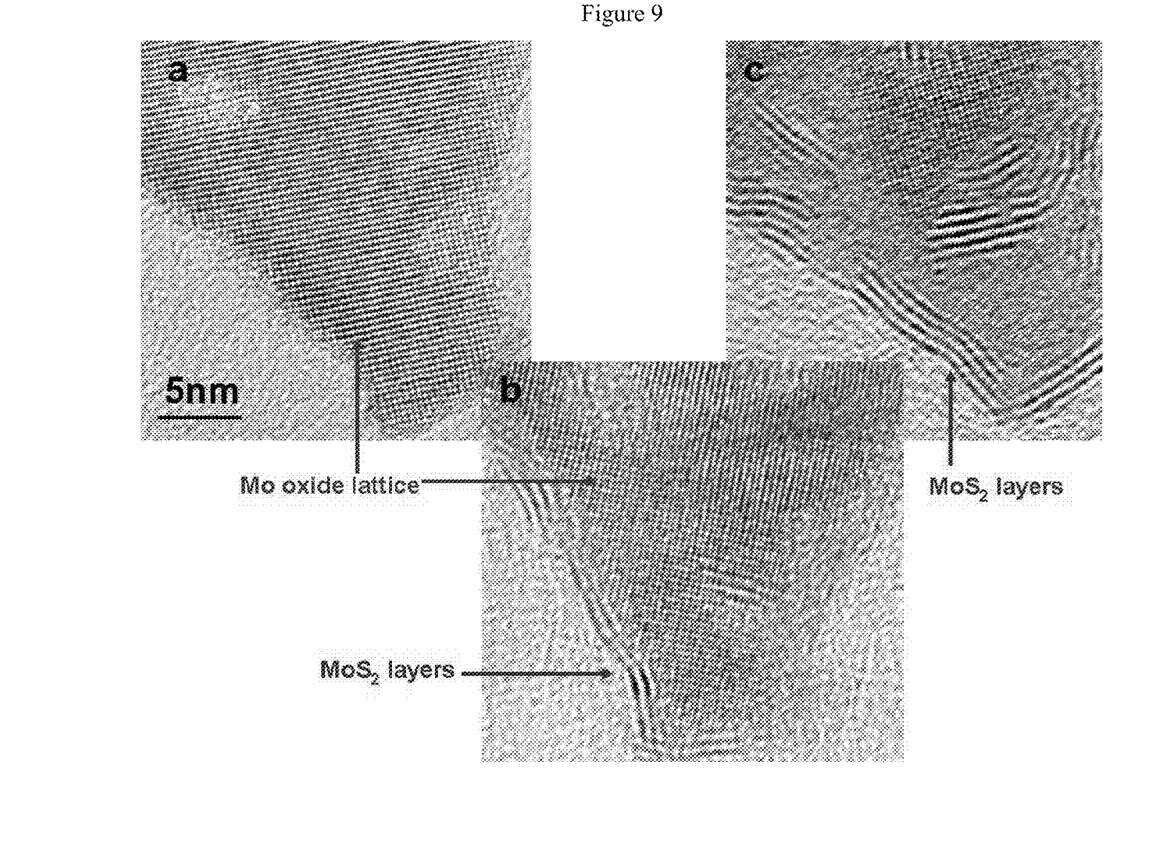
Figure 10:
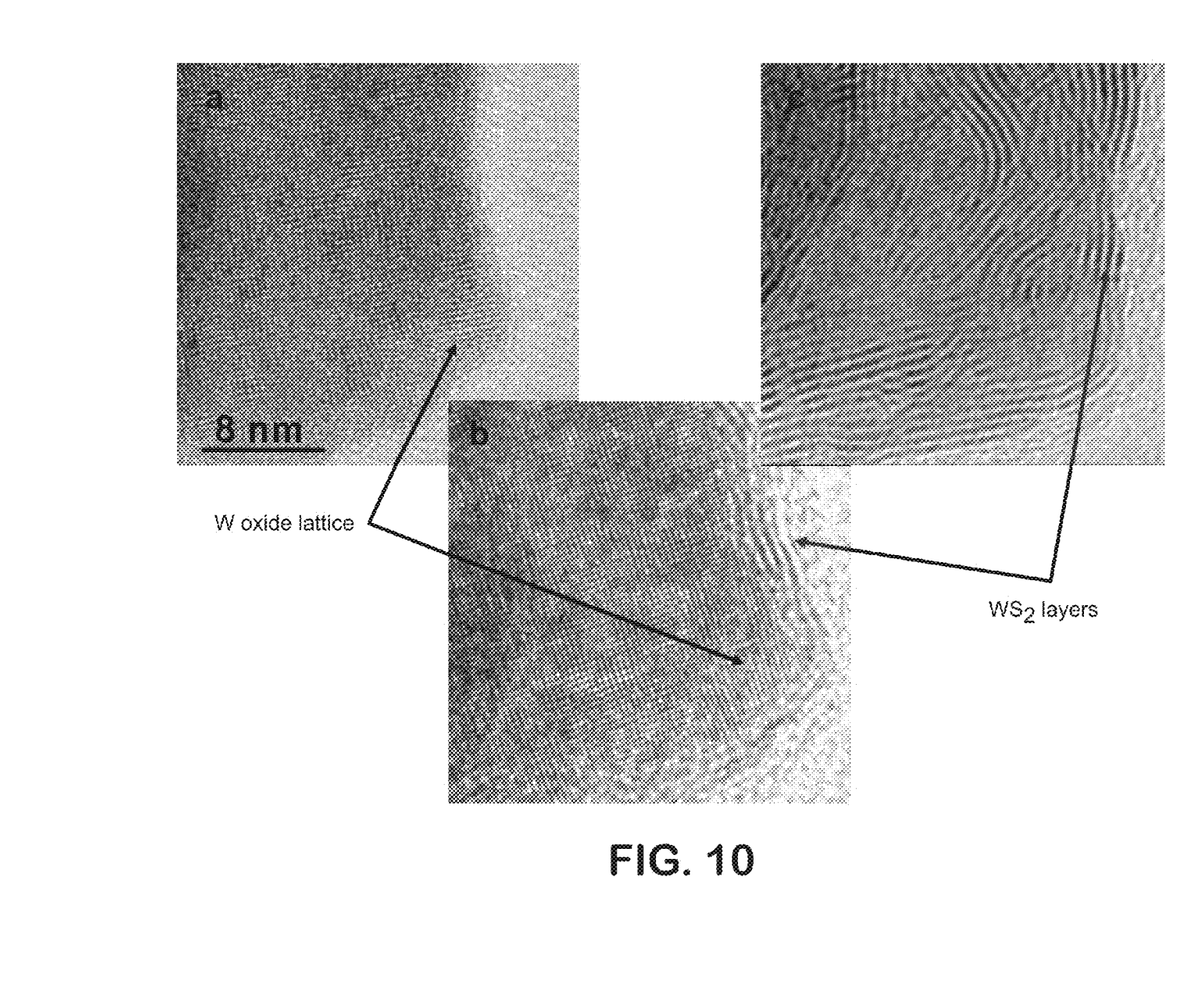

Again $Ni_1Mo_{0.5}W_{0.5}O_4$ was prepared and sulfided in flowing (~20 cm³/min) ~10 vol % $H_2S$ (remainder $H_2$) to about 400° C. for about 2 hours using the protocol described previously. The sulfided material was prepared for and examined in the TEM as described above. Conventional TEM observations consistently revealed curved $MoS_2/WS_2$ particles adjacent to $Ni_xS$ particles and relatively straight (un-curved) $MoS_2/WS_2$ particles in $Ni_xS$-lean regions of the catalyst (see FIG. 6). The relationship between the $Ni_xS$ particles and the $MoS_2/WS_2$ particle curvature was confirmed by TEM tilting experiments. FIG. 7 reflects the typical straight $MoS_2/WS_2$ particle morphology formed in a $Ni_xS$-lean region. The two interpenetrating $MoS_2/WS_2$ structures further confirmed the tendency for these particles to grow as relatively straight (un-curved) structures in $Ni_xS$-lean regions of the catalyst (see FIG. 7). FIG. 8 presents the curved $MoS_2/WS_2$ particle morphology that develops adjacent to a $Ni_xS$ particle. Without being bound by theory, it is believed that the $MoS_2/WS_2$ curvature results when hydrogen spillover at the $Ni_xS$ surface leads to nucleation and growth of the $MoS_2/WS_2$ particle. Lastly, FIG. 9 presents TEM micrographs that help elucidate the sulfidation mechanism associated with a highly crystalline molybdenum oxide particle in a $Ni_xS$-lean region of the catalyst. In such situations, sulfidation appeared to begin with a transformation at the molybdenum oxide particle's exterior surface, progressing inward. This resulted in a sulfide particle morphology generally similar to its parent oxide particle (see FIGS. 9(a)-(c)). Thus, again, a relatively straight (un-curved) $MoS_2$ structure forms. Similar results were observed in the sulfidation of a tungsten oxide crystal (see FIGS. 10(a)-(c)).

Example 4

Figure 11:
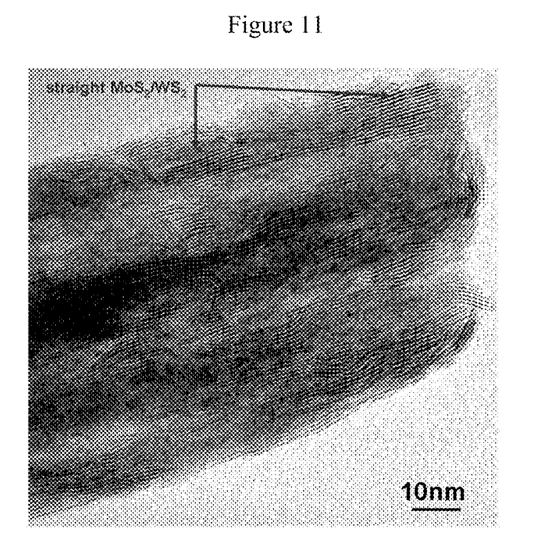
FIGS. 11 and 12 are bright field TEMs of the fully sulfided metal oxide catalyst of Example 4.
Figure 12:
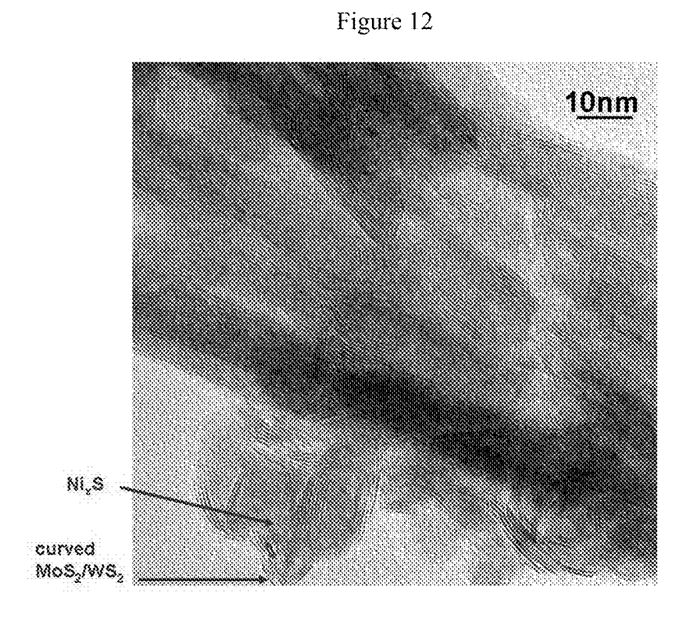

A low nickel composition having the approximate formula $Ni_{0.25}Mo_{0.5}W_{0.5}O_4$ was prepared following the protocol described in U.S. Patent Application Publication No. 2007/0090023, and was sulfided as described previously. This material was prepared for and examined in the TEM as described above. Conventional TEM observations again revealed numerous straight $MoS_2/WS_2$ areas in $Ni_xS$-lean regions of the catalyst (see FIG. 11), while curved $MoS_2/WS_2$ areas were observed adjacent to $Ni_xS$ structures (see FIG. 12). This again confirms the proposed relationship between the presence of $Ni_xS$ particles and the resulting $MoS_2/WS_2$ particle morphology.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for producing a hydroprocessing catalyst, the process comprising:
    (a) forming a reaction mixture comprising a source of a first metal oxide in a protic liquid and heating the reaction mixture under hydrothermal conditions to form a particulate metal oxide composition, the first metal oxide comprising an oxide of at least one first metal selected from Group 6 of the Periodic Table of Elements;
    (b) mixing the formed particulate metal oxide composition with particles of a sulfide of at least one second metal selected from Groups 8 to 10 of the Periodic Table of the Elements to produce a particulate catalyst precursor; and
    (c) sulfiding the particulate catalyst precursor under conditions sufficient to at least partially convert the components of the particulate catalyst precursor into a layered metal sulfide having defect sites associated with the second metal sulfide.

2. The process of claim 1, wherein the at least one first metal is molybdenum and/or tungsten.

3. The process of claim 1, wherein the particulate metal oxide composition comprises from about 55 wt % to about 60 wt % of Group 6 metal oxide(s).

4. The process of claim 1, wherein the particulate metal oxide composition further comprises an oxide of at least one further metal selected from Groups 8 to 10 of the Periodic Table of the Elements.

5. The process of claim 4, wherein the at least one further metal is cobalt and/or nickel.

6. The process of claim 4, wherein the particulate metal oxide composition comprises up to about 45 wt % of Group 8 to 10 metal oxide(s).

7. The process of claim 1, wherein the at least one second metal sulfide is nickel sulfide and/or cobalt sulfide.

8. The process of claim 1, wherein the particulate catalyst precursor comprises from about 20 wt % to about 25 wt % of the second metal sulfide.

9. The process of claim 1, wherein the sulfiding is conducted by heating the particulate catalyst precursor in the presence of hydrogen sulfide at a temperature from about 375° C. to about 400° C. for about 2 hours to about 4 hours.

10. A method for hydroprocessing a hydrocarbon-containing feedstock, the method comprising:
   (a) producing a hydroprocessing catalyst according to the process of claim 1; and
   (b) contacting the hydrocarbon-containing feedstock with hydrogen in the presence of the hydroprocessing catalyst under conditions sufficient to hydroprocess the hydrocarbon feedstock.

\* \* \* \* \*